United States Patent
Sato et al.

(10) Patent No.: US 10,600,371 B2
(45) Date of Patent: Mar. 24, 2020

(54) DISPLAY APPARATUS, DISPLAY CONTROL METHOD, AND COMPUTER READABLE MEDIUM

(71) Applicant: CANON KABUSHIKI KAISHA, Tokyo (JP)

(72) Inventors: Masahiro Sato, Tokyo (JP); Hirofumi Urabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/100,091

(22) Filed: Aug. 9, 2018

(65) Prior Publication Data

US 2019/0066606 A1 Feb. 28, 2019

(30) Foreign Application Priority Data

Aug. 22, 2017 (JP) .................... 2017-158984

(51) Int. Cl.
*G09G 3/34* (2006.01)
*G09G 3/20* (2006.01)
*G06T 5/00* (2006.01)
*G09G 3/32* (2016.01)
*G09G 3/36* (2006.01)
*G02F 1/133* (2006.01)
*G02F 1/1335* (2006.01)

(52) U.S. Cl.
CPC .......... *G09G 3/3413* (2013.01); *G06T 5/007* (2013.01); *G09G 3/2003* (2013.01); *G02F 1/133611* (2013.01); *G06T 2207/20208* (2013.01); *G09G 3/32* (2013.01); *G09G 3/36* (2013.01); *G09G 3/3607* (2013.01); *G09G 2320/0626* (2013.01); *G09G 2340/06* (2013.01); *G09G 2360/16* (2013.01)

(58) Field of Classification Search
CPC combination set(s) only.
See application file for complete search history.

(56) References Cited

U.S. PATENT DOCUMENTS

| 10,186,210 B2 * | 1/2019 | Umeyama ............ G09G 3/3426 |
| 2011/0037785 A1 * | 2/2011 | Shiomi ................ G09G 3/3426 345/690 |

(Continued)

FOREIGN PATENT DOCUMENTS

| JP | 2005-321423 A | 11/2005 |
| JP | 4047598 B2 | 2/2008 |

*Primary Examiner* — Wesner Sajous
(74) *Attorney, Agent, or Firm* — Canon U.S.A., Inc. IP Division

(57) ABSTRACT

A display apparatus includes a display unit configured to display images, an image obtaining unit configured to obtain an image to be displayed in the display unit, a reception unit configured to receive a luminance setting associated with a luminance of a light source included in the display unit, and a controller configured to display a display image obtained by replacing at least a region of the image to be displayed with a colored image in the display unit. The controller sets a first luminance as a luminance of the colored image in a case where a first luminance setting value is set as the luminance setting, and sets a second luminance that is lower than the first luminance as the luminance of the colored image in a case where a second luminance setting value that is higher than the first luminance setting value is set as the luminance setting.

15 Claims, 11 Drawing Sheets

(56) References Cited

U.S. PATENT DOCUMENTS

2017/0287121 A1* 10/2017 Nagashima ............. G06T 5/007
2017/0323618 A1* 11/2017 Takanashi ........... G06F 3/04847
2018/0033400 A1*  2/2018 Nagashima ............. G06T 5/007

* cited by examiner

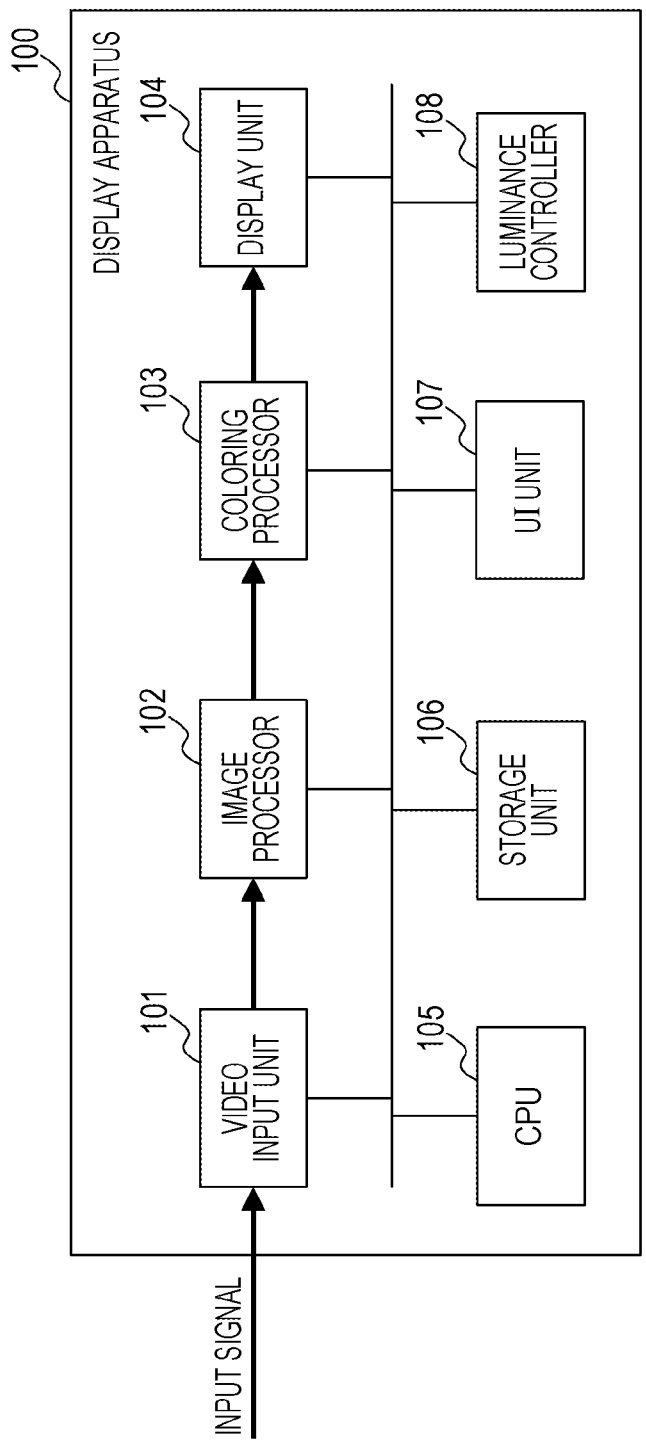

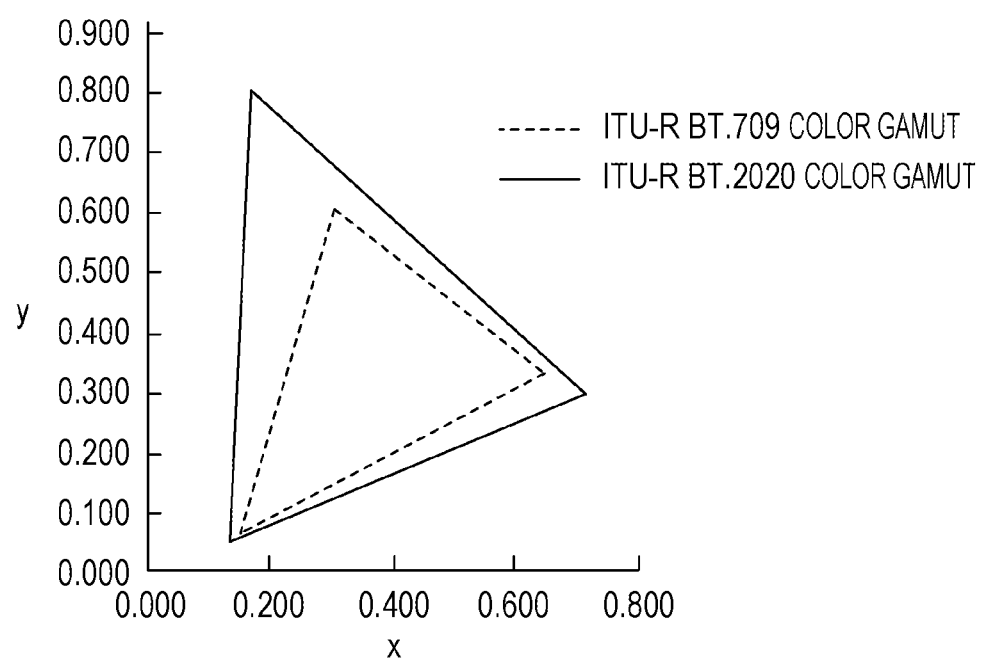

DISPLAY APPARATUS, DISPLAY CONTROL METHOD, AND COMPUTER READABLE MEDIUM

BACKGROUND

Field of the Disclosure

The present disclosure relates to a display apparatus which displays an image, a display control method, and a computer readable medium.

Description of the Related Art

A technique of displaying information associated with an image being displayed in a display in a certain color is used. Japanese Patent No. 4047598 discloses a technique of displaying portions having luminance levels out of a predetermined range in a color different from an original color when luminance levels of image data frequently become out of the predetermined range.

High luminance of video production displays is enhanced, and displays which are capable of displaying images with high luminance (1000 cd/m$^2$ or more, for example) and which support High Dynamic Range (HDR) have been widely used. When a coloring process is performed using a display capable of performing high luminance display, a luminance level in colored portions may be excessively high, and therefore, the colored regions may be excessively bright for the user watching the colored portions.

SUMMARY

According to an aspect of the present disclosure, a display apparatus includes a display unit configured to display images, an image obtaining unit configured to obtain an image to be displayed in the display unit, a reception unit configured to receive a luminance setting associated with a luminance of a light source included in the display unit, and a display controller configured to display a display image obtained by replacing a region of the image to be displayed with a colored image having a lower gradation value as a luminance setting value indicated by the luminance setting is higher.

According to another aspect of the present disclosure, a display control method includes obtaining an image to be displayed in a display unit which displays images, receiving a luminance setting associated with luminance of a light source included in the display unit, and displaying a display image obtained by replacing at least a region of the image to be displayed with a colored image in the display unit.

Further features of the some embodiments will become apparent from the following description of exemplary embodiments with reference to the attached drawings.

BRIEF DESCRIPTION OF THE DRAWINGS

FIG. 1 is a diagram illustrating a configuration of a display apparatus according to a first embodiment.

FIG. 13 is a diagram illustrating the relationship between a color gamut setting and the gradation value gain.

FIG. 14 is a diagram illustrating the relationship between the Rec. 709 color gamut and the Rec. 2020 color gamut.

DESCRIPTION OF THE EMBODIMENTS

First Embodiment

Overview of Display Apparatus 100

Figure 2A:
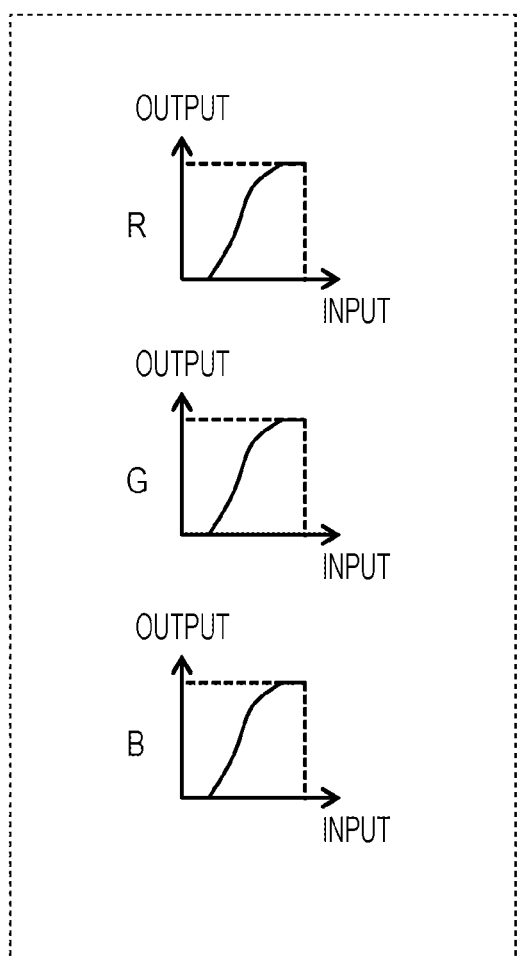
FIG. 2A is a diagram illustrating the relationship between an image to be displayed and a display image in a general display apparatus.
Figure 2B:
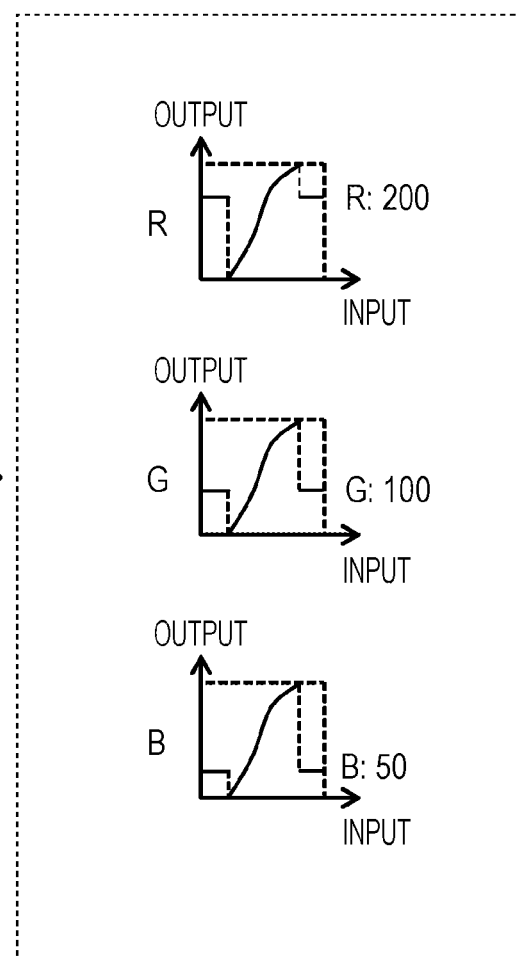
FIG. 2B is a diagram illustrating the relationship between an image to be displayed and a display image in the display apparatus according to this embodiment.

FIG. 1 is a diagram illustrating a configuration of a display apparatus 100 according to a first embodiment. FIGS. 2A and 2B are diagrams illustrating a coloring function of the display apparatus 100. The display apparatus 100 is a display capable of controlling a display luminance and may be a liquid crystal display or an organic electroluminescence (EL) display, for example.

The display apparatus 100 displays, when a pixel having a value out of a displayable color gamut is included in an input image to be displayed, an image obtained by superposing a colored image on the input image to be displayed so that a user may recognize that the pixel out of the color gamut is included. In this embodiment, it is assumed that the display apparatus 100 is capable of displaying a color gamut (hereinafter referred to as "the Rec. 709 color gamut") defined by ITU-R BT.709. When an image to be displayed having a color gamut defined by ITU-R BT. 2020 (hereinafter referred to as "the Rec. 2020 color gamut"), which is larger than the Rec. 709 color gamut, is input, the display apparatus 100 displays an image obtained by replacing a pixel which is not included in the Rec. 709 color gamut in the image to be displayed with a pixel of a predetermined color. By this, the user may recognize that the pixel of the color gamut which may not be displayed in the display apparatus 100 is included in the image to be displayed.

FIGS. 2A and 2B are diagrams illustrating the relationship between a pixel value of the image to be displayed input to the display apparatus 100 and a pixel value of the image displayed by the display apparatus 100. FIG. 2A is a diagram illustrating the relationship between an image to be displayed and a display image in a general display apparatus. FIG. 2B is a diagram illustrating the relationship between an image to be displayed and a display image in the display apparatus 100 according to this embodiment.

As illustrated in FIG. 2B, in a case where a pixel in the image to be displayed has a value smaller than a predetermined range or equal to or larger than the predetermined range, the display apparatus 100 displays the image by replacing the value of the original pixel with a pixel value of a specific color. In the case of the example illustrated in FIG. 2B, the display apparatus 100 replaces the pixel value out of the predetermined range with a pixel value of (R, G, B)=(200, 100, 50). When at least one of the pixel values of R, G, and B is out of the predetermined range, for example, the pixel value is replaced with a pixel value of a specific color for display.

When such a colored image is to be displayed, the display apparatus 100 reduces a gradation value of the colored image as a luminance setting value of a light source (a backlight, for example) of a display panel is increased. In this way, in a case where the luminance of the backlight of a liquid crystal display is high, for example, when the gradation value of the colored image is low, transmittance of the liquid crystal panel is reduced, and accordingly, the colored image viewed by the user has an appropriate luminance level. As a result, the user does not perceive any excessive brightness. The luminance setting value is an example of a luminance setting associated with a luminance of the light source of the display panel and is received by a user interface (UI) unit 107, described below, which functions as a reception unit.

Configuration of Display Apparatus 100

Hereinafter, a configuration of the display apparatus 100 will be described with reference to FIG. 1.

The display apparatus 100 includes a video input unit 101, an image processor 102, a coloring processor 103, a display unit 104, a central processing unit (CPU) 105, a storage unit 106, the UI unit 107, and a luminance controller 108. The video input unit 101 is an interface which receives an input of a video signal including an image to be displayed in the display unit 104 and functions as an image obtaining unit which obtains the image to be displayed. The video input unit 101 may include a serial digital interface (SDI) input terminal based on the SDI standard, for example. The video input unit 101 converts an input SDI signal into a format of a video signal that may be processed in the display apparatus 100 and outputs the video signal to the image processor 102 after the conversion. It is assumed here that, in a description below, the video signal has a bit depth of 10 bits.

The image processor 102 performs gradation correction on an image to be displayed that is output from the video input unit 101. The image processor 102 may correct gradation using a 1D LUT (one-dimensional Look-Up Table) that is determined in advance in accordance with a gradation characteristic set by the user through the UI unit 107. The user may set the gradation characteristic including the gamma 2.2, which is a gradation characteristic of a standard dynamic range (SDR) method; SMPTE ST2084 (a Perceptual Quantizer (PQ) method), which is a gradation characteristic of an HDR method; or a hybrid LOG gamma, for example. The image processor 102 inputs the image to be displayed that has been subjected to the gradation correction to the coloring processor 103.

The coloring processor 103 is a display control unit that performs the coloring process on the image to be displayed, which is supplied from the image processor 102, so as to generate a display image on which a colored image is superposed. The coloring processor 103 determines a gradation value gain of the colored image based on a setting value of the luminance of the backlight so as to generate a 3D LUT (three-dimensional Look-Up Table) corresponding to the determined gradation value gain. The gradation value gain is a ratio of a gradation value to a reference gradation value of the colored image that is used when a luminance setting value is smaller than a predetermined value. The coloring processor 103 generates the colored image based on the generated 3D LUT and outputs the display image including the coloring image to the display unit 104.

Figure 3A:
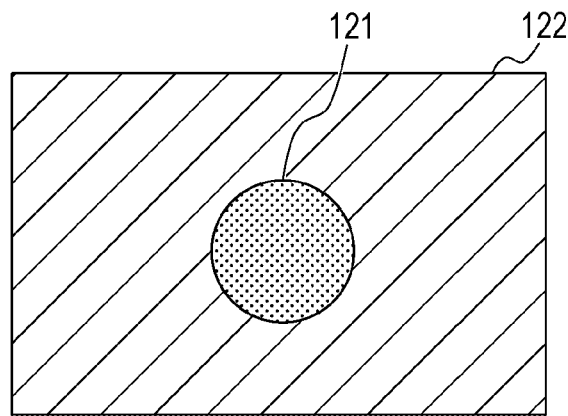
FIG. 3A is a diagram illustrating an example of an image input to a coloring processor.
Figure 3B:
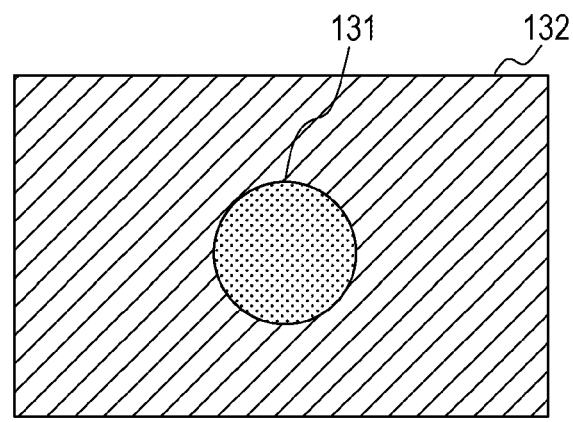
FIG. 3B is a diagram illustrating an example of an image output from the coloring processor.

FIGS. 3A and 3B are diagrams illustrating a display example of the colored image. FIG. 3A is a diagram illustrating an image to be displayed that is input to the coloring processor 103. All pixels included in an internal region 121 of a center circle are included in the Rec. 709 color gamut and all pixels included in an outer region 122 of the circle are outside of the Rec. 709 color gamut. FIG. 3B is a display image generated by the coloring processor 103 when a gradation setting is ST2084, a coloring process setting is in an ON state, and a luminance setting value of the backlight is 1000 cd/m$^2$.

Pixels in the internal region 131 are not out of the Rec. 709 color gamut, and therefore, the coloring processor 103 does not replace the pixels with a colored image, and the coloring processor 103 maintains the pixels having the same gradation values as the input image to be displayed. The coloring processor 103 replaces pixels of (R, G, B)=(1023, 0, 0) which are out of the Rec. 709 color gamut and which are included in the external region 132 of the circle, with pixels of (R, G, B)=(512, 0, 0) obtained by multiplying the pixels by a gradation value gain of 0.5, for example. In this way, when the luminance setting value of the backlight is high, a gradation value of the colored image that indicates an out-of-color gamut is reduced so that any excessive brightness of the colored image that is recognized when the user views the colored image may be reduced.

The coloring processor 103 generates a colored image having a lower gradation value as a setting value of the luminance of the backlight serving as a light source included in the display unit 104 is increased. The coloring processor 103 replaces a pixel value of a region of a portion of the image to be displayed with the gradation value of the colored image so as to generate a display image. The coloring processor 103 replaces values of the pixels that are out of the range of the predetermined color gamut (the Rec. 709 color gamut, for example) in the plurality of pixels included in the image to be displayed with the gradation value of the colored image so as to generate a display image.

Figure 4:
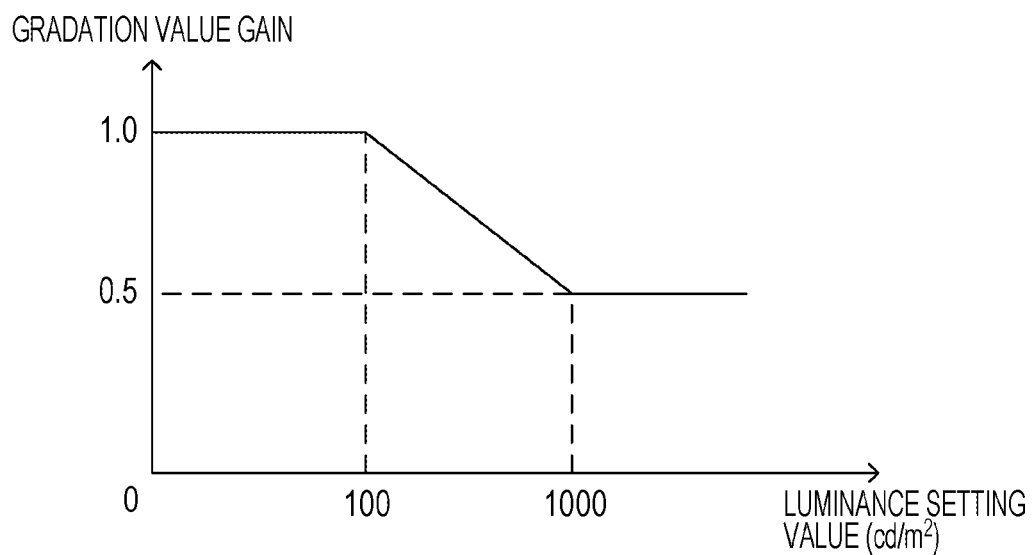
FIG. 4 is a graph illustrating the relationship between a luminance setting value of a backlight and a gradation value of a colored image.

FIG. 4 is a graph illustrating the relationship between a luminance setting value of the backlight and a gradation value of the colored image. A gradation value gain in an axis of ordinates in FIG. 4 is a value indicating a ratio of a gradation value of each luminance setting value relative to a gradation value of the colored image used when a luminance setting value is smaller than 100 cd/m$^2$. The coloring processor 103 determines that a gradation value of the colored image is linearly reduced as the luminance setting value is increased in a case where the luminance setting value is equal to or larger than 100 cd/m$^2$ and smaller than 1000 cd/m$^2$. As described above, the coloring processor 103 linearly reduces the gradation value of the colored image as the luminance setting value is increased so that a display luminance determined in accordance with a product of the luminance of the backlight and the gradation value of the colored image is included in a predetermined range. As a result, the user may view a colored image having a luminance of a substantially fixed level irrespective of the luminance of the backlight.

Furthermore, the coloring processor 103 determines a gradation value gain of 0.5 when the luminance setting value is equal to or larger than 1000 cd/m$^2$. In this way, the coloring processor 103 sets a fixed gradation value gain of the colored image when the luminance setting value is equal to or larger than 1000 cd/m² so that occurrences of a case where the colored image is saturated are significantly lowered and so that it is difficult for the user to recognize that the colored image is suppressed.

Note that the coloring processor 103 may determine a gradation value of the colored image based on the gradation characteristic used in the generation of a display image. For example, the coloring processor 103 may use different gradation value gains for the same luminance setting value depending on a result of a determination as to whether the gradation characteristic is ST2084 or the hybrid LOG gamma. In this way, the coloring processor 103 may generate a colored image having a gradation value suitable for the gradation characteristic.

Referring back to FIG. 1, the display unit 104 in this embodiment includes the liquid crystal panel and the backlight, and the display unit 104 displays a display image input from the coloring processor 103. Luminance of the backlight is controlled by the luminance controller 108.

The CPU 105 executes a program stored in a nonvolatile memory included in the storage unit 106 so as to control operation of the display apparatus 100. The storage unit 106 includes a storage medium, such as a read only memory (ROM), a random access memory (RAM), and a hard disk.

The UI unit 107 is a control (e.g., button) disposed on a case of the display apparatus 100 and is an example of a reception unit that accepts user operations. The UI unit 107 receives a setting value (cd/m²) of display luminance and an ON/OFF setting of the coloring process from the user.

The luminance controller 108 controls an amount of light emission of the backlight of the display unit 104 based on the luminance setting value set by the user through the UI unit 107. The luminance controller 108 controls the amount of light emission of the backlight so as to control display luminance when the user views the display image.

Figure 5:
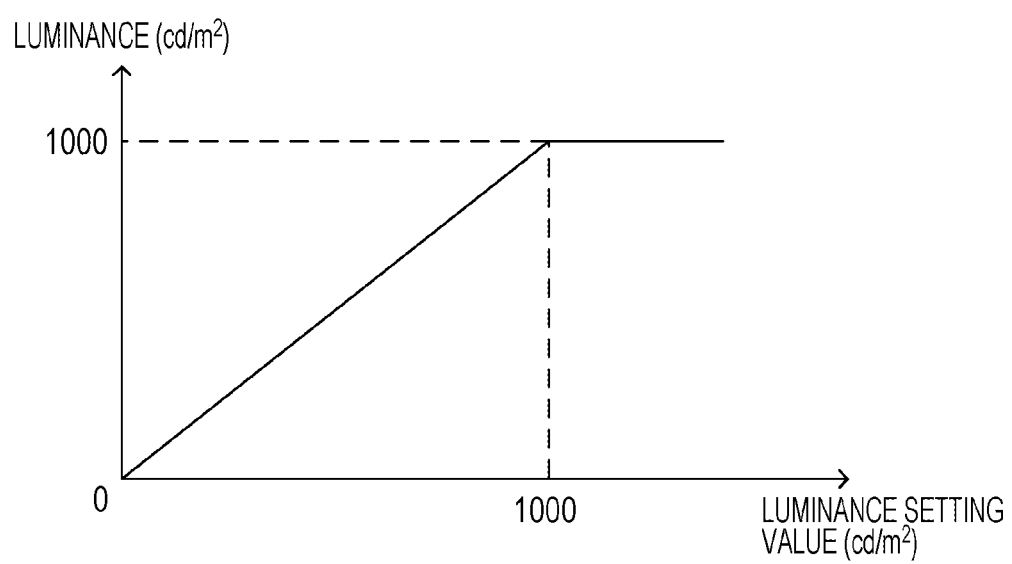
FIG. 5 is a graph illustrating the relationship between the luminance setting value and luminance of the backlight.

FIG. 5 is a graph illustrating the relationship between the luminance setting value and the luminance of the backlight. When the display luminance setting is equal to or larger than 0 cd/m² and smaller than 1000 cd/m², the luminance controller 108 emits the backlight in a luminance value that is the same as the luminance setting value. When the luminance setting value is equal to or larger than 1000 cd/m², the luminance controller 108 causes the backlight to emit light with a luminance of 1000 cd/m² irrespective of the luminance setting value.

The luminance controller 108 may control the luminance of the backlight to be equal to or smaller than a predetermined value when the UI unit 107 receives a coloring setting indicating that a display image that includes a colored image is generated and the luminance setting value is equal to or larger than the predetermined value. In a case of the example illustrated in FIG. 5, the luminance controller 108 causes the backlight to emit light with a luminance of 1000 cd/m² irrespective of the luminance setting value when the luminance setting value is equal to or larger than 1000 cd/m², provided that the coloring process is in an ON state. By this, when the luminance setting value is equal to or larger than the predetermined value, the luminance controller 108 does not increase the display luminance of the backlight even when the coloring processor 103 does not reduce the gradation value gain, so as to prevent excessive brightness for the user when the colored image is displayed.

Furthermore, when the UI unit 107 has not received a coloring setting or when the luminance setting value is smaller than a predetermined value, the luminance controller 108 may operate the light source with a luminance corresponding to the luminance setting. By this, the luminance controller 108 may prevent uncomfortable perceptions of the user that are caused by a dark backlight.

Processing Procedure of Display Apparatus 100

Figure 6:
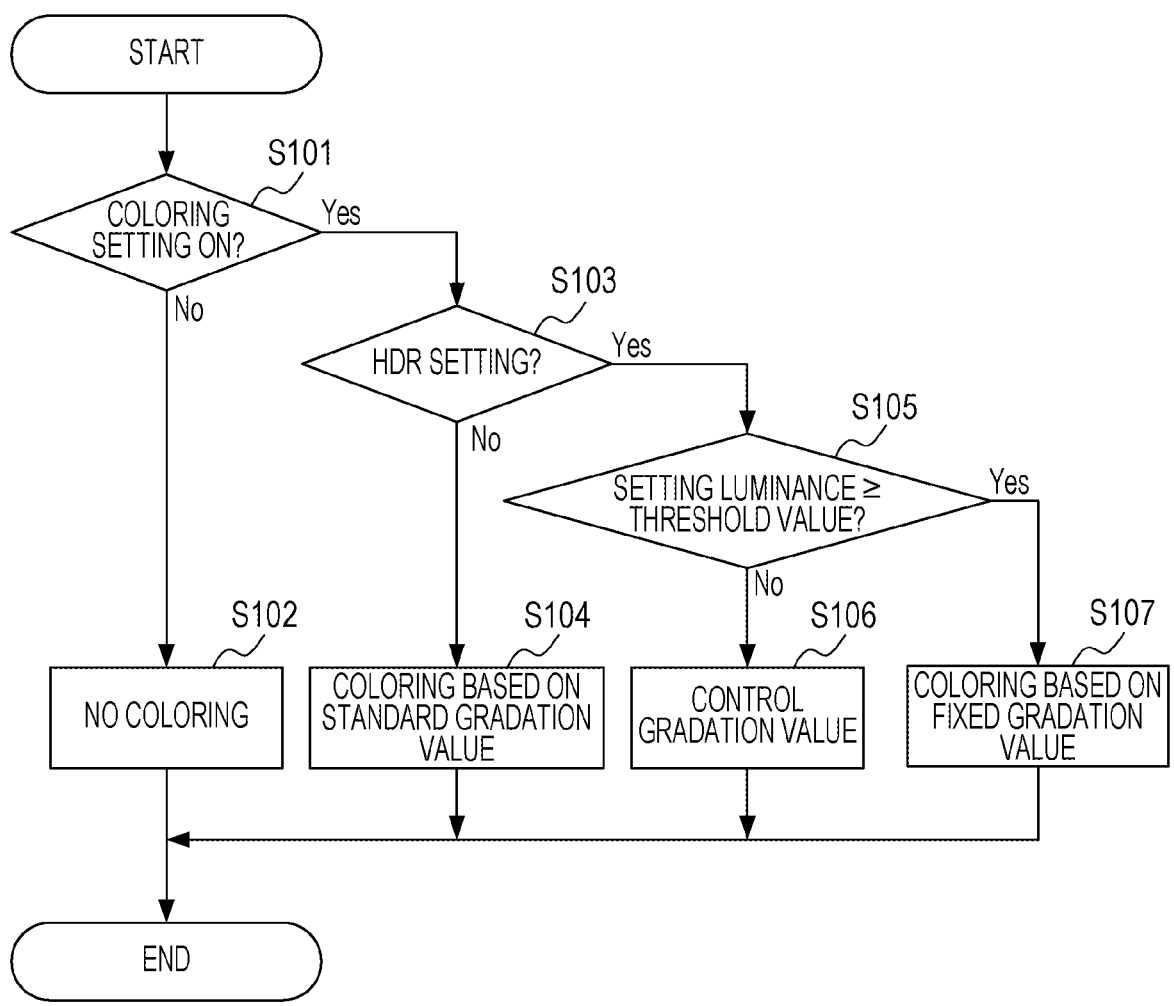
FIG. 6 is a flowchart of a processing procedure of the display apparatus.

FIG. 6 is a flowchart of a processing procedure of the display apparatus 100. When receiving a user operation from the UI unit 107, the coloring processor 103 determines a state of a coloring setting (S101). When determining that the coloring setting is in an OFF state (No in S101), the coloring processor 103 does not apply color on an input image to be displayed and outputs the image to be displayed as a display image to the display unit 104 (S102).

When determining that the coloring setting is in an ON state in step S101 (Yes in S101), the coloring processor 103 determines whether the gradation characteristic is set to the HDR method (S103). For example, when the gradation characteristic is set to ST2084, the coloring processor 103 determines that the gradation characteristic of the HDR method is set.

When the UI unit 107 does not accept the gradation characteristic of the HDR method, the coloring processor 103 displays a display image including a colored image of a predetermined gradation value in the display unit 104. For example, when determining that the gradation characteristic is not the HDR setting in step S103 (No in S103), the coloring processor 103 generates a 3D LUT for performing the coloring process so that pixels out of the color gamut are mapped to (R, G, B)=(1023, 0, 0). The coloring processor 103 generates a display image by replacing the pixels out of the color gamut with a standard gradation value based on the generated 3D LUT and outputs the generated display image to the display unit 104 (S104).

On the other hand, when the UI unit 107 accepts the gradation characteristic of the HDR method, the coloring processor 103 displays a display image including a colored image of a lower gradation value as the luminance setting value is increased in the display unit 104. For example, when determining that the gradation characteristic is the HDR setting in step S103 (Yes in S103), the coloring processor 103 may determine a gradation value gain using the relationship between the luminance setting value and the gradation value gain illustrated in FIG. 4. When the gradation value gain is to be determined, the coloring processor 103 compares the luminance setting value with a threshold value (1000 cd/m² in FIG. 4, for example) (S105). When the luminance setting value is smaller than the threshold value (within a predetermined range), the coloring processor 103 controls a gradation value of the colored image so that the gradation value gain is reduced as the luminance setting value is increased (S106).

In this case, the coloring processor 103 generates a 3D LUT for coloring pixels out of the color gamut using a color obtained by multiplying the values of the pixels by the gradation value gain. The coloring processor 103 determines the gradation value of the colored image based on the generated 3D LUT. For example, when the gradation value gain is determined to be 0.5, the coloring processor 103 determines (R, G, B)=(512, 0, 0) by multiplying a standard gradation value (R, G, B)=(1023, 0, 0) by a gradation value gain of 0.5 as a gradation value of the colored image.

When determining that the luminance setting value is equal to or larger than the threshold value (out of the predetermined range) in step S105 (Yes in S105), the coloring processor 103 determines a fixed gradation value as a gradation value of the colored image irrespective of the luminance setting value (S107). By this, when color pixels out of the color gamut are set to be colored and the gradation characteristic is the HDR setting, the display apparatus 100 may display a display image including the colored image of a gradation value suitable for the luminance setting value of the backlight.

Aspects of Display Apparatus 100

As described above, in the display apparatus 100, in the range of the luminance setting value from 100 to 1000 cd/m$^2$, the coloring processor 103 reduces a gradation value of the colored image as the luminance setting value is increased so that display luminance in a range that has been subjected to the coloring process is prevented from being increased. By this, when the user turns on the coloring process setting in the display apparatus 100 that performs display in the gradation characteristic of the HDR setting, the display apparatus 100 may reduce excessive brightness when the user views the colored image.

Furthermore, when the luminance setting is equal to or larger than 1000 cd/m$^2$, the coloring processor 103 may maintain the saturation of an applied color in a certain level or more by fixing a coloring gradation value and a display luminance, and accordingly, glare may be reduced.

Although an out-of-709-color-gamut alert display is illustrated as an example of the coloring process in the foregoing description, the configuration of this embodiment may be employed in coloring processes in other displays. For example, the display apparatus 100 may apply the coloring process of this embodiment to coloring functions including false color for displaying distribution of luminance levels of an image to be displayed in color, peaking for displaying pixels including a high frequency component in color, displaying an alert of an overexposure region, and displaying an alert of an underexposure region.

Second Embodiment

In the first embodiment, when a coloring amount is small, as in the case where a gradation value of an image to be displayed that has not been colored is high, even if any need for reduction of a gradation value of a colored image is low, the gradation value of the colored image is reduced in accordance with the luminance setting value of the backlight. On the other hand, a second embodiment is different from the first embodiment only in that a gradation value is controlled in accordance with a coloring amount or a gradation value of a pixel to be colored.

Figure 7:
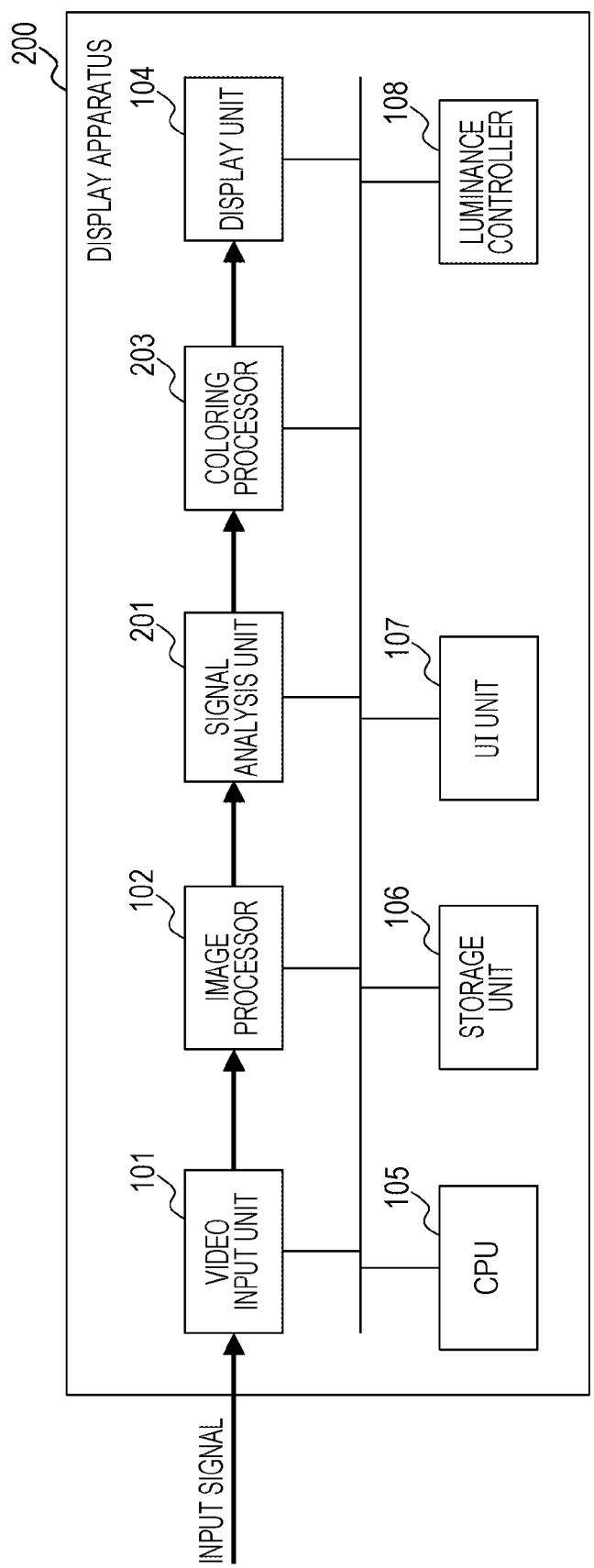
FIG. 7 is a diagram illustrating a configuration of a display apparatus according to a second embodiment.

FIG. 7 is a diagram illustrating a configuration of a display apparatus 200 according to the second embodiment. Blocks which perform processes the same as those in the display apparatus 100 of the first embodiment illustrated in FIG. 1 are denoted by reference numerals which are the same as those of FIG. 1, and descriptions thereof are omitted. The display apparatus 200 includes a video input unit 101, an image processor 102, a signal analysis unit 201, a coloring processor 203, a display unit 104, a CPU 105, a storage unit 106, a UI unit 107, and a luminance controller 108.

The signal analysis unit 201 analyzes an image to be displayed which is input from the image processor 102 so as to obtain a colored pixel ratio, which is a ratio of the number of pixels to be colored to the number of all pixels, and an average value of the gradation values of the pixels to be colored (hereinafter referred to as an "average gradation value"). The signal analysis unit 201 inputs the obtained colored pixel ratio and the average gradation value in the coloring processor 203 along with the image to be displayed. The coloring processor 203 determines a gradation value gain based on at least one of a luminance setting value, the colored pixel ratio, and the average gradation value.

The coloring processor 203 generates a colored image of a lower gradation value as the number of pixels to be colored is increased, for example. The coloring processor 203 may generate a colored image of a lower gradation value as the number of pixels in a display image that are to be colored is larger. Furthermore, the coloring processor 203 may generate a colored image of a lower luminance as an average gradation value of a plurality of pixels to be colored is lower. Note that the coloring processor 203 may use a median or a mode of the gradation values of the pixels to be colored instead of the average gradation value.

Figure 8:
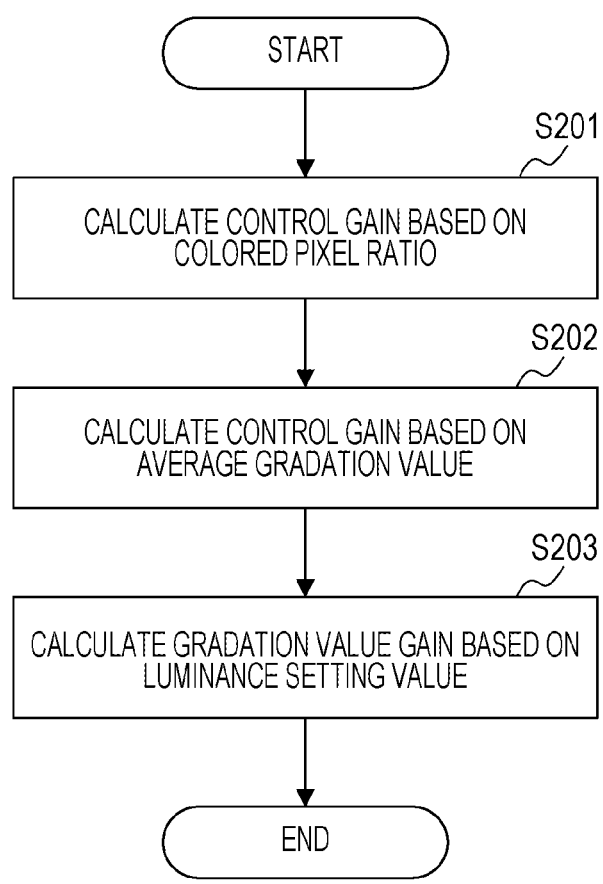
FIG. 8 is a flowchart of a process of calculating a gradation value gain performed by the coloring processor.
Figure 9:
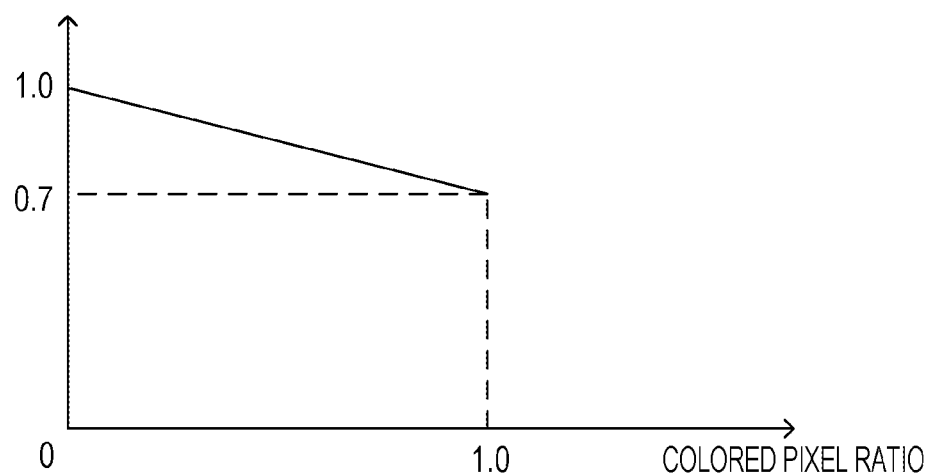
FIG. 9 is a diagram illustrating the relationship between a colored pixel ratio and a control gain.
Figure 10:
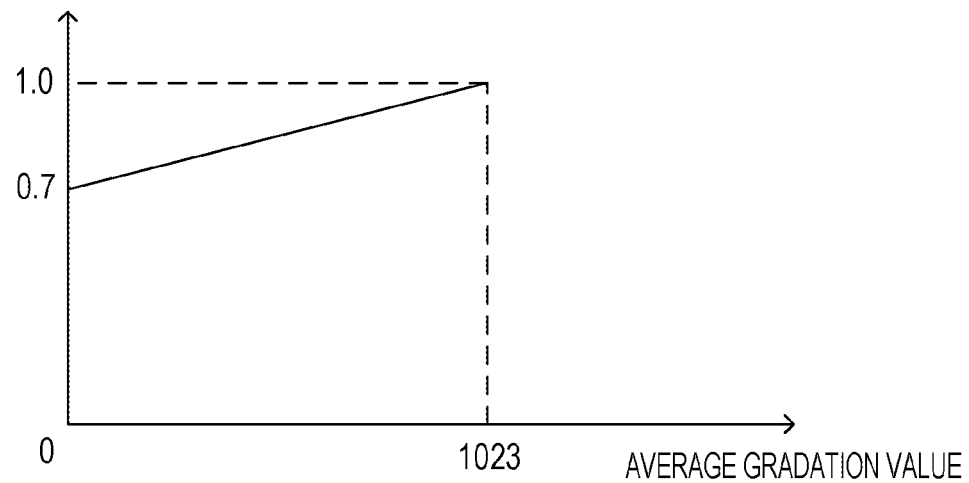
FIG. 10 is a diagram illustrating the relationship between an average gradation value and the control gain.

FIG. 8 is a flowchart of a process of calculating a gradation value gain performed by the coloring processor 203. FIG. 9 is a diagram illustrating the relationship between a colored pixel ratio and a control gain $\alpha 1$. FIG. 10 is a diagram illustrating the relationship between the average gradation value and a control gain $\alpha 2$. The control gain $\alpha 1$ is a coefficient for controlling a gradation value gain in accordance with the colored pixel ratio. The control gain $\alpha 2$ is a coefficient for controlling the gradation value gain in accordance with the average gradation value.

First, the coloring processor 203 calculates the control gain $\alpha 1$ based on a colored pixel ratio calculated by the signal analysis unit 201 (S201). For example, the coloring processor 203 may specify the control gain $\alpha 1$ corresponding to the colored pixel ratio by referring to a graph of the relationship between the colored pixel ratio and the control gain $\alpha 1$, such as the graph illustrated in FIG. 9. For example, the coloring processor 203 determines 1.0 as the control gain $\alpha 1$ when the colored pixel ratio is 0. Also for example, the coloring processor 203 determines 0.7 as the control gain $\alpha 1$ when the colored pixel ratio is 1.0. The coloring processor 203 linearly reduces the control gain $\alpha 1$ as the colored pixel ratio is increased.

Additionally, the coloring processor 203 calculates the control gain $\alpha 2$ based on an average gradation value calculated by the signal analysis unit 201 (S202). For example, the coloring processor 203 may calculate the control gain $\alpha 2$ by referring to a graph of the relationship between the average gradation value and the control gain $\alpha 2$, such as the graph illustrated in FIG. 10. For example, the coloring processor 203 determines 0.7 as the control gain $\alpha 2$ when the average gradation value is 0. Also for example, the coloring processor 203 determines 1.0 as the control gain $\alpha 2$ when the average gradation value is 1023. The coloring processor 203 increases the control gain $\alpha 2$ as the average gradation value is increased.

Figure 11:
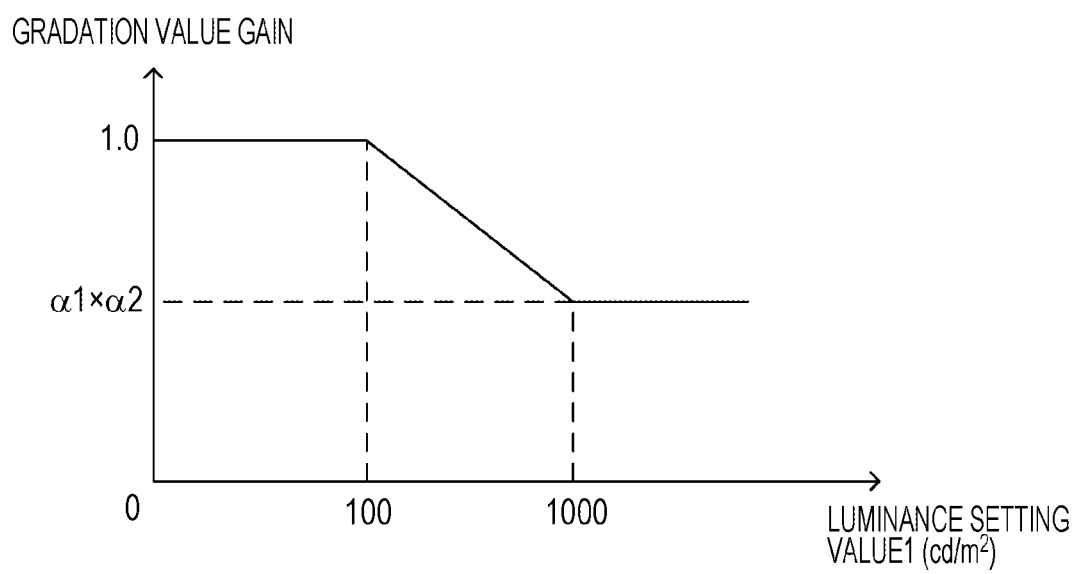
FIG. 11 is a diagram illustrating the relationship between the luminance setting value and the gradation value gain.

Finally, the coloring processor 203 calculates a gradation value gain based on a luminance setting value (S203). FIG. 11 is a diagram illustrating the relationship between a luminance setting value and a gradation value gain. The coloring processor 203 determines a gradation value gain of 1.0 when the luminance setting value is equal to or larger than 0 cd/m$^2$ and smaller than 100 cd/m$^2$. The coloring processor 203 linearly reduces a gradation value gain as a luminance setting value is increased in a case where the luminance setting value is equal to or larger than 100 cd/m$^2$ and smaller than 1000 cd/m$^2$. When the luminance setting value is equal to or larger than 1000 cd/m$^2$, the coloring processor 203 may determine a product of the control gain $\alpha 1$ obtained in step S201 and the control gain $\alpha 2$ obtained in step S202 as a gradation value gain. Furthermore, the coloring processor 203 may determine $\alpha 1 \times \alpha 2$ as the gradation value gain when the luminance setting value is equal to or larger than 1000 cd/m$^2$.

Specifically, the control gain α1 becomes smaller and the gradation value gain also becomes smaller as the colored pixel ratio increases. Accordingly, a gradation value of a color applied by the coloring processor 203 is reduced as the colored pixel ratio is increased. Furthermore, the control gain α2 becomes smaller and the gradation value gain becomes smaller as the average gradation value of the colored pixel is increased. Accordingly, luminance of colors applied by the coloring processor 203 is reduced as the average gradation value of the colored pixel is reduced.

The case where the coloring processor 203 controls a gradation value of a colored image using both of the colored pixel ratio and the average gradation value of the pixels to be colored has been described as an example. However, the gradation value of the colored image may be controlled based on one of the color pixel ratio and the average gradation value.

Aspects of Display Apparatus 200

As described above, in the display apparatus 200, the coloring processor 203 produces a colored image of a color having a lower gradation value as the colored pixel ratio is increased. By this, the display apparatus 200 may reduce excessive brightness for the user when a ratio of pixels to be colored is large. Furthermore, in the display apparatus 200, the coloring processor 203 produces a colored image of a color having a lower gradation value as the average gradation value of pixels to be colored is smaller. In this way, the display apparatus 200 reduces excessive brightness for the user caused by applying color of a gradation value that is excessively high on pixels having low gradation values.

Third Embodiment

Although the case where pixels out of the color gamut are colored is mainly described as an example in the first and second embodiments, a peaking function for applying color on pixels having high-frequency components will be described as an example in this embodiment.

Figure 12:
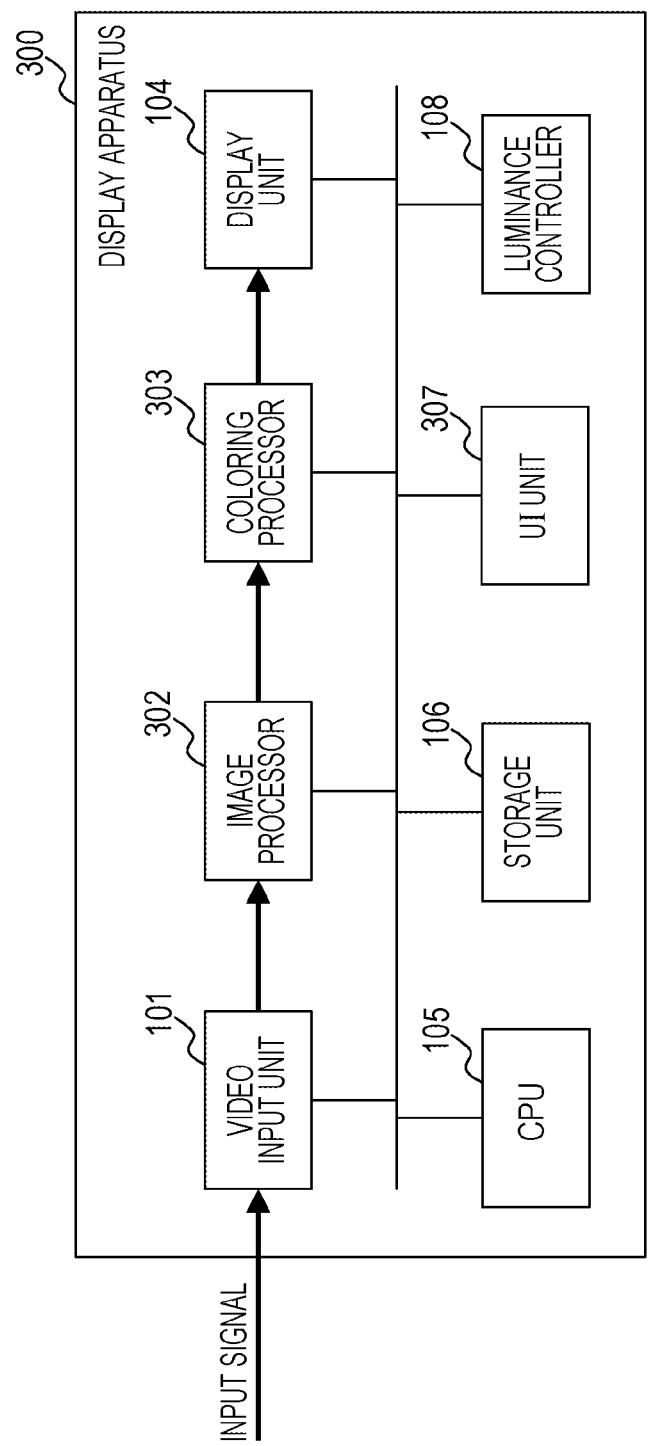
FIG. 12 is a diagram illustrating a configuration of a display apparatus according to a third embodiment.

FIG. 12 is a diagram illustrating a configuration of a display apparatus 300 according to a third embodiment. Components that perform processes the same as those in the display apparatus 100 of the first embodiment illustrated in FIG. 1 are denoted by reference numerals that are the same as those of FIG. 1, and descriptions thereof are omitted. The display apparatus 300 is characterized in that a gradation value of a colored image is controlled in accordance with a color gamut for displaying an image.

The display apparatus 300 includes a video input unit 101, an image processor 302, a coloring processor 303, a display unit 104, a CPU 105, a storage unit 106, a UI unit 307, and a luminance controller 108. The UI unit 307 has a function of receiving a color gamut setting from the user in addition to the function of the UI unit 107 in the display apparatus 100 according to the first embodiment. For example, the Rec. 709 color gamut or the Rec. 2020 color gamut may be received as the color gamut setting.

The image processor 302 performs a color gamut conversion process, in addition to the process performed by the image processor 102 of the display apparatus 100 according to the first embodiment, so that an input image to be displayed is displayed in a display color gamut set through the UI unit 307. The image processor 302 inputs the image to be displayed after the color gamut is converted to the coloring processor 303.

The coloring processor 303 analyzes a frequency component for the input image to be displayed and applies color to pixels having frequencies equal to or larger than a frequency of a predetermined value. The coloring processor 303 outputs a display image including a colored image of a lower gradation value as a color gamut indicated by the color gamut setting, and the display unit 104 displays the display image.

FIG. 13 is a table illustrating the relationship between the color gamut setting and the gradation value gain. FIG. 14 is a diagram illustrating the relationship between the Rec. 709 color gamut and the Rec. 2020 color gamut. The coloring processor 303 determines a gradation value gain of 1.0 when a display color gamut is the Rec. 709 color gamut and a gradation value gain of 0.8 when a display color gamut is the Rec. 2020 color gamut, as illustrated in FIG. 13, for example. The Rec. 2020 color gamut is larger than the Rec. 709 color gamut, as illustrated in FIG. 14, and therefore, the coloring processor 303 determines a gradation value gain of the Rec. 2020 color gamut of 0.8, which is smaller than a gradation value gain of 1.0 of the Rec. 709 color gamut.

The coloring processor 303 calculates a gradation value of the colored image in a peaking display in the Rec. 2020 color gamut by multiplying a gradation value (1023, 0, 0) of the colored image in the peaking display in the Rec. 709 color gamut by the gradation value gain. For example, when the gradation value gain is 0.8 in the Rec. 2020 color gamut of the display color gamut, the coloring processor 303 replaces a pixel of a high frequency component with a colored image of (R, G, B)=(818, 0, 0).

In the foregoing description, the coloring processor 303 determines a gradation value gain of 1.0 in the Rec. 709 color gamut and a gradation value gain of 0.8 in the Rec. 2020 color gamut. However, the coloring processor 303 may calculate the gradation value gain based on a chromaticity coordinate point of each color gamut. Specifically, the coloring processor 303 may generate a colored image of an RGB value obtained by converting (R, G, B)=(1023, 0, 0) in the Rec. 709 color gamut into the Rec. 2020 color gamut so that the user may similarly view the colored image in the Rec. 709 color gamut and the Rec. 2020 color gamut.

Aspects of Display Apparatus 300

As described above, the coloring processor 303 performs the coloring process using a color of a lower gradation value when a color gamut to be displayed is larger in the display apparatus 300. By this, a difference between display colors due to a difference between color gamuts to be displayed is reduced and excessive brightness perceived by the user when a color gamut is large may be reduced.

Although the present disclosure is described with reference to the embodiments, the technical scope of the present disclosure is not limited to the range disclosed in the foregoing embodiments, and various modifications and changes may be made within the scope of the present disclosure. For example, at least some of the functions of the video input unit 101, the image processor 102, the coloring processor 103, and the luminance controller 108 may be realized when the CPU 105 executes a program stored in a recording medium, such as the storage unit 106.

Furthermore, although the case where the light source is the backlight of the liquid crystal display is described as an example in the description above, a light emission layer of an organic EL display functions as the light source when the display apparatus is an organic EL display.

Note that distribution and integration of the devices are not limited to those in the foregoing embodiments, and all or some of the devices may be functionally or physically configured in a distributed manner or an integrated manner. Arbitrary combinations of the plurality of embodiments are also included in the present disclosure. The scope of the above-described embodiments is not seen to be limiting, and various modifications and changes are possible within the scope or substance thereof.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Btu-ray Disc (BD)™), a flash memory device, a memory card, and the like.

While the present disclosure has described some exemplary embodiments, it is to be understood that the claims are not limited to the disclosed exemplary embodiments. The scope of the following claims is to be accorded the broadest interpretation so as to encompass all such modifications and equivalent structures and functions.

This application claims priority to Japanese Patent Application No. 2017-158984, filed Aug. 22, 2017, which is hereby incorporated by reference herein in its entirety.

What is claimed is:

1. A display apparatus, comprising:
a display unit including a panel configured to be controlled on a basis of a gradation value of a display image and a light source configured to emit light to the panel, the display unit being configured to display the display image;
an image obtaining interface configured to obtain an image to be displayed;
a user interface configured to receive a luminance setting associated with a luminance of the light source; and
a display controller configured to generate the display image from the image to be displayed, the generated display image including a colored image made by coloring a region which, in the image to be displayed, has a predetermined condition, and cause the display unit to display the generated display image,
wherein the display controller, based on the luminance setting received by the user interface, sets a first gradation value as a gradation value of the colored image in a case where a first luminance setting value is set as the luminance setting, and sets a second gradation value that is lower than the first gradation value as the gradation value of the colored image in a case where a second luminance setting value that is higher than the first luminance setting value is set as the luminance setting.

2. The display apparatus according to claim 1, wherein, in a case where a luminance setting value indicated by the luminance setting is within a predetermined range, the display controller replaces the region with the colored image of a lower gradation value as the luminance setting value increases.

3. The display apparatus according to claim 1, wherein the display controller replaces a gradation value out of a range of a predetermined color gamut in the image to be displayed with a gradation value of the colored image.

4. The display apparatus according to claim 1, wherein the display controller generates the colored image of a certain gradation value in a case where the luminance setting value is equal to or larger than a threshold value.

5. The display apparatus according to claim 1, wherein the display controller determines the gradation value of the colored image such that a display luminance determined in accordance with a product between the luminance of the light source and the gradation value of the colored image is included in a predetermined range in a case where the luminance setting value is within a predetermined range.

6. The display apparatus according to claim 1, wherein the display controller generates the colored image of a lower gradation value as the number of pixels to be colored increases.

7. The display apparatus according to claim 1, wherein the display controller generates the colored image of a lower gradation value as the number of pixels to be colored relative to the number of pixels of the display image to be displayed increases.

8. The display apparatus according to claim 1, wherein the display controller generates the colored image of a lower gradation value as mean, median, or mode of gradation values of a plurality of pixels to be colored is lower.

9. The display apparatus according to claim 1, wherein the display controller determines the gradation value of the colored image based on a gradation characteristic used in generation of the display image.

10. The display apparatus according to claim 1,
wherein the user interface further receives a setting of a gradation characteristic, and
wherein the display controller sets the first gradation value as the gradation value of the colored image in a case where the first luminance setting value is set as the luminance setting and sets the second gradation value as the gradation value of the colored image in a case where the second luminance setting value is set as the luminance setting, in a case where the user interface receives a gradation characteristic of an HDR method.

11. The display apparatus according to claim 1,
wherein the user interface further receives a color gamut setting of the display image, and
wherein the display controller reduces the gradation value of the colored image as a color gamut indicated by the color gamut setting is larger.

12. The display apparatus according to claim 1,
wherein the display controller includes a luminance controller configured to control the luminance of the light source based on the luminance setting,
wherein the user interface accepts a coloring setting for determining whether the display image including the colored image is to be generated, and wherein the luminance controller controls the luminance of the light source to be a certain luminance in a case where the user interface receives the coloring setting and a luminance setting value of the luminance setting is equal to or larger than a predetermined value.

13. The display apparatus according to claim 12, wherein the luminance controller operates the light source in a luminance corresponding to the luminance setting value in a case where the user interface does not accept the coloring setting or the luminance setting value is smaller than the predetermined value.

14. A display control method, comprising:
obtaining an image to be displayed on a display unit that displays a display image on a basis of a gradation value of the display image;
receiving a luminance setting associated with a luminance of a light source included in the display unit; and
generating the display image from the image to be displayed, the generated display image including a colored image made by coloring a region which, in the image to be displayed, has a predetermined condition, and causing the display unit to display the generated display image,
wherein a first gradation value is set as a gradation value of the colored image in a case where a first luminance setting value is set as the luminance setting, and a second gradation value that is lower than the first gradation value is set as the gradation value of the colored image in a case where a second luminance setting value that is higher than the first luminance setting value is set as the luminance setting.

15. A non-transitory computer readable medium that stores a program, wherein the program, when executed on a computer, causes the computer to:
obtain an image to be displayed on a display unit that displays a display image on a basis of a gradation value of the display image;
receive a luminance setting associated with a luminance of a light source included in the display unit; and
generate the display image from the image to be displayed, the generated display image including a colored image made by coloring a region which, in the image to be displayed, has a predetermined condition, and causing the display unit to display the generated display image,
wherein a first gradation value is set as a gradation value of the colored image in a case where a first luminance setting value is set as the luminance setting, and a second gradation value that is lower than the first gradation value is set as the gradation value of the colored image in a case where a second luminance setting value that is higher than the first luminance setting value is set as the luminance setting.

* * * * *